(12) United States Patent
Liang

(10) Patent No.: US 12,370,019 B1
(45) Date of Patent: Jul. 29, 2025

(54) DENTAL ALIGNER APPARATUS WITH RAPID DENTAL MOLD SUPPLYING ARRANGEMENT

(71) Applicants: Jian Liang, Walnut, CA (US); Jijun Zhuang, Walnut, CA (US)

(72) Inventor: Jian Liang, Walnut, CA (US)

(73) Assignees: Jian Liang, Walnut, CA (US); Jijun Zhuang, Walnut, CA (US)

( * ) Notice: Subject to any disclaimer, the term of this patent is extended or adjusted under 35 U.S.C. 154(b) by 0 days.

(21) Appl. No.: 18/655,212

(22) Filed: May 3, 2024

(51) Int. Cl.
| | |
|---|---|
| *A61C 7/08* | (2006.01) |
| *B29C 33/30* | (2006.01) |
| *B29C 51/10* | (2006.01) |
| *B29C 51/20* | (2006.01) |
| *B29C 51/26* | (2006.01) |
| *B29C 51/42* | (2006.01) |
| *B29K 33/00* | (2006.01) |
| *B29K 105/00* | (2006.01) |
| *B29L 31/00* | (2006.01) |

(52) U.S. Cl.
CPC .............. *A61C 7/08* (2013.01); *B29C 33/307* (2013.01); *B29C 51/10* (2013.01); *B29C 51/20* (2013.01); *B29C 51/421* (2013.01); *B29C 51/261* (2013.01); *B29K 2033/12* (2013.01); *B29K 2105/256* (2013.01); *B29L 2031/753* (2013.01)

(58) Field of Classification Search
CPC ..... B29C 31/006; B29C 31/008; B29C 31/08; B29C 51/261
See application file for complete search history.

(56) References Cited

U.S. PATENT DOCUMENTS

| | | | | |
|---|---|---|---|---|
| 4,273,607 A | * | 6/1981 | Paul ................... | B29C 43/18 156/566 |
| 9,738,014 B2 | * | 8/2017 | Maeyama ............. | B29C 43/18 |
| 2012/0135096 A1 | * | 5/2012 | Maeyama ............. | B29C 31/008 425/161 |
| 2013/0224323 A1 | * | 8/2013 | Meinzinger ........... | B29C 31/006 425/183 |

FOREIGN PATENT DOCUMENTS

DE 102021111198 A1 * 11/2022

* cited by examiner

*Primary Examiner* — Seyed Masoud Malekzadeh
(74) *Attorney, Agent, or Firm* — Tsz Lung Yeung

(57) ABSTRACT

A dental aligner apparatus includes a main housing, a raw material feeder, a heating element, a high pressure blowing module, and a rapid dental mold supplying arrangement, which includes a main frame, a plurality of partitioning plates, and a pusher member. The pusher member is supported in the main housing for moving between an idle position and a working position, wherein in the idle position, the pusher member is slid out of the through operation opening, wherein in the working position, the pusher member is moved to slide through the through operation opening so as to push a dental mold out of the main frame to accommodate in a sealing compartment, wherein the high blowing module is actuated to provide pressurized air in the sealing compartment for allowing the sheet raw material in the heated and deformable state to fittedly conform with the dental mold and form a dental aligner.

8 Claims, 12 Drawing Sheets

DENTAL ALIGNER APPARATUS WITH RAPID DENTAL MOLD SUPPLYING ARRANGEMENT

BACKGROUND OF THE PRESENT INVENTION

Field of Invention

The present invention relates to dental equipment, and more particularly to a dental aligner apparatus which is capable of rapidly and efficiently producing dental aligners with minimized human interventions.

Description of Related Arts

A conventional method used for adjusting teeth alignment includes the use of metallic braces which are to be attached on the patients' teeth. The braces restrict the movement of the teeth and therefore achieve progressive adjustments of the overall alignment of the teeth. This method has become widely adopted throughout the world to correct improper alignments of teeth. A major problem is that the braces are clearly visible so that they may be undesirable in many social and professional settings.

Clear or transparent aligners have been developed to tackle this problem. In this technology, clear teeth aligners are made and fit on patients' teeth. These teeth aligners are a series of tight-fitting custom-made mouthpieces that slip over the teeth for restricting or controlling the movement of the teeth. A patient needs to wear a teeth aligner for a predetermined period of time. This teeth aligner is then replaced by another as the adjustment progresses. These different aligners have slightly different alignments so that by wearing each of these aligners for successive periods of time, the alignment of the patients' teeth can be gradually adjusted and corrected.

Although this technology has an advantage over the traditional brace method, the production of these clear aligners represents a challenge because of its low efficiency. Currently, several molds of the patient's teeth are produced by different computerized technologies. These molds correspond to different stages of desirable alignments. Several aligners are then created for each stage. The major problem is that when producing aligners, the molds of the teeth must be manually fed into a machine which is arranged to apply a thin film of heated plastic or other material over the molds. Because a full procedure requires many different clear aligners, and because each mold must be manually fed into the machine to form a single teeth aligner, the entire production process becomes very time-consuming and inefficient.

As a result, there is a need to develop an apparatus which involves automatic production of teeth aligners so as to improve the efficiency of the entire production process and to minimize human intervention.

SUMMARY OF THE PRESENT INVENTION

Certain variations of the present invention provide a dental aligner apparatus which is capable of rapidly and efficiently producing dental aligners for making progressive adjustments of teeth alignment.

Certain variations of the present invention provide a dental aligner apparatus which comprises a rapid dental mold supplying arrangement which is capable of rapidly supplying workable dental molds for further processing into dental aligners with minimum human interventions.

Certain variations of the present invention provide a dental aligner apparatus which comprises a rapid dental mold supplying arrangement which allows batch processing of pre-loaded dental molds so as to substantially increase the efficiency by which dental aligners are produced.

In one aspect of the present invention, it provides a dental aligner apparatus for producing dental aligner using a plurality of dental molds, comprising:

a main housing which has a receiving cavity, and comprises a work platform having a discharge opening;

a raw material feeder supported in the main housing, the raw material feeder being arranged to be imparted with a predetermined amount of sheet raw material;

a plurality of guiding rollers spacedly provided in the main housing for driving the sheet raw material to move in the receiving cavity;

a heating element provided in the main housing, the sheet raw material being arranged to be heated by the heating element to form a heated and deformable state;

a high pressure blowing module which is provided in the receiving cavity, and comprises a sealing compartment and a high pressure blower communicating with the sealing compartment, the sheet raw material in the heated and deformable state being driven to move to the sealing compartment; and a rapid dental mold supplying arrangement which is supported in the receiving cavity, and comprises:

a main frame having an accommodating cavity for accommodating the dental molds, and a through operation opening formed at a bottom portion thereof;

a plurality of partitioning plates detachably provided in the accommodating cavity, each of the partitioning plates being positioned between two adjacent dental molds; and a pusher member movably supported in the receiving cavity on the work platform in such a manner that the pusher member is arranged to move between an idle position and a working position, wherein in the idle position, the pusher member is slid out of the through operation opening, wherein in the working position, the pusher member is moved to slide through the through operation opening so as to push the corresponding dental mold out of the accommodating cavity to accommodate in the sealing compartment, wherein the high pressure blower is actuated to provide pressurized air in the sealing compartment for allowing the sheet raw material in the heated and deformable state to fittedly conform with the dental mold and form a dental aligner, wherein when the pusher member is moved back to the idle position, the corresponding partitioning plate is discharged out of the main housing through the discharge opening.

In another aspect of the present invention, it provides a rapid dental mold supplying arrangement for a dental aligner apparatus having a high pressure blowing module, the rapid dental mold supplying arrangement comprising:

a main frame having an accommodating cavity for accommodating a plurality of dental molds, and a through operation opening formed at a bottom portion thereof;

a plurality of partitioning plates detachably provided in the accommodating cavity, each of the partitioning plates being positioned between two adjacent dental molds; and a pusher member movably supported in a receiving cavity of the dental aligner apparatus in such a manner that the pusher member is arranged to move between an idle position and a working position, wherein in the idle position, the pusher member is at rest and is aligned with the through operation opening, wherein in the working position, the pusher member is moved to slide through the through operation opening so as to push the corresponding dental mold out of the accommodating cavity to feed into the high pressure blowing module, so that the dental mold is capable of being conformed with the sheet raw material in heated and deformable form to form a dental aligner, wherein when the pusher member is moved back to the idle position, the partitioning plate and the dental mold are discharged out of the dental aligner apparatus.

This summary presented above is provided merely to introduce certain concepts and not to identify any key or essential features of the claimed subject matter.

DETAILED DESCRIPTIONS OF THE PRESENT INVENTION

Figure 1:
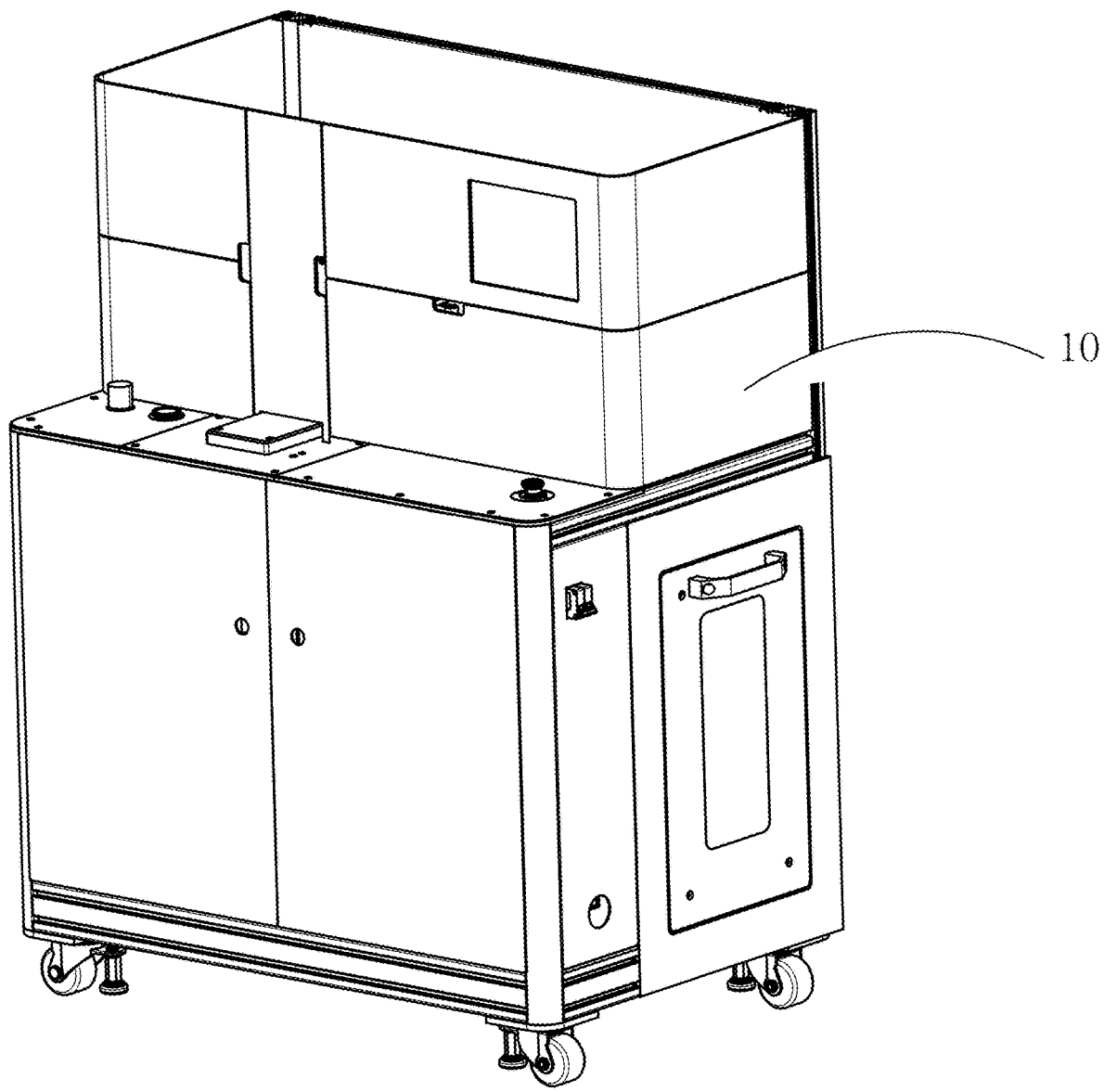
FIG. 1 is a perspective view of a dental aligner apparatus according to a preferred embodiment of the present invention, illustrating an outer appearance of the dental aligner apparatus.

The following detailed description of the preferred embodiment is the preferred mode of carrying out the invention. The description is not to be taken in any limiting sense. It is presented for the purpose of illustrating the general principles of the present invention.

In the following descriptions, it should also be appreciated that the terms "arrange" and "set" in the following description refer to the connecting relationship in the accompanying drawings for easy understanding of the present invention. For example, the "arrange" and "set" may refer to one element directly or indirectly set or arrange on another element. Therefore, the above terms should not be an actual connection limitation of the elements of the present invention.

It should also be appreciated that the terms "center", "length", "width", "thickness", "top", "bottom", "front", "rear", "left", "right", vertical", "horizontal", "upper", "lower", "interior", and "exterior" in the following description refer to the orientation or positioning relationship in the accompanying drawings for easy understanding of the present invention without limiting the actual location or orientation of the present invention. Therefore, the above terms should not be an actual location limitation of the elements of the present invention.

Moreover, it should be appreciated that the terms "first", "second", "one", "a", and "an" in the following description refer to "at least one" or "one or more" in the embodiment. In particular, the term "a" in one embodiment may refer to "one" while in another embodiment may refer to "more than one". Therefore, the above terms should not be an actual numerical limitation of the elements of the present invention.

It should be appreciated that the terms "install", "connect", "couple", and "mount" in the following description refer to the connecting relationship in the accompanying drawings for easy understanding of the present invention. For example, the connection may refer to permanent connection or detachable connection. Therefore, the above terms should not be an actual connection limitation of the elements of the present invention.

Referring to FIG. 1 to FIG. 12 of the drawings, a dental aligner apparatus according to a preferred embodiment of the present invention is illustrated. Broadly, the dental aligner apparatus may comprise a main housing 10, a raw material feeder 20, a plurality of guiding rollers 30, a heating element 40, a high pressure blowing module 50, and a rapid dental mold supplying arrangement 60. The dental aligner apparatus is for producing dental aligners using a plurality of dental molds.

The main housing 10 may have a receiving cavity 11, and may comprise a work platform 12 having a discharge opening 121. The raw material feeder 20 may be supported in the main housing 10, and may be arranged to be imparted with a predetermined amount of sheet raw material 100.

The plurality of guiding rollers 30 may be spacedly provided in the main housing 10 for guiding the sheet raw material 100 to move in the receiving cavity 11 of the main housing 10.

The heating element 40 may be provided in the main housing 10, wherein the sheet raw material 100 may be arranged to be heated by the heating element 40 to form a heated and deformable state.

The high pressure blowing module 50 may be provided in the receiving cavity 11, and may comprise a sealing compartment 51 and a high pressure blower 52 communicating with the sealing compartment 51, wherein the heated sheet raw material 100 may be moved to the sealing compartment 51 for further processing.

The rapid dental mold supplying arrangement 60 may be supported in the receiving cavity 11, and may comprise a main frame 61, a plurality of partitioning plates 62, and a pusher member 63.

The main frame 61 may have an accommodating cavity 611 for accommodating the dental molds 200, and a through operation opening 612 formed at a bottom portion 613 thereof.

The plurality of partitioning plates 62 may be detachably provided in the accommodating cavity 611 for separating each two adjacent dental molds 200, wherein at least one of the dental molds 200 may be exposed in the through operation opening 612.

The pusher member 63 is movably supported in the receiving cavity 11 of the main housing 10 in such a manner that the pusher member 63 may be arranged to move between an idle position and a working position, wherein in the idle position, the pusher member 63 may be at rest and may be slid out of the through operation opening 612, wherein in the working position, the pusher member 63 may be moved to slide through the through operation opening 612 so as to push the corresponding dental mold 200 out of the accommodating cavity 611 to accommodate in the sealing compartment 51, wherein the high pressure blower 52 may be actuated to provide pressurized air in the sealing compartment 51 for allowing the heated sheet raw material 100 to fittedly conform with the dental mold 200 and form a dental aligner, wherein when the pusher member 63 is moved back to the idle position, the partitioning plate 62 may be discharged out of the main housing 10 through the discharge opening 121.

According to the preferred embodiment of the present invention, the dental aligner apparatus thus described may be utilized to manufacture dental aligners by using the raw sheet material 100 and the dental mold 200 with minimum human intervention. The dental aligners thus manufactured may be attached on a user's teeth for a predetermined period of time for allowing guided and gradual adjustment of teeth alignment. The dental aligners may be configured from the sheet raw material 100 which is to be heated by the heating element 40 to form the heated and deformable state. The heated raw sheet material 100 may then be applied to the dental mold 200. The dental mold 200 may be produced by computerized estimation of user's teeth alignment. Thus, the dental mold 200 may be produced by 3D printing, computer-aided machining technology etc. A plurality of dental molds 200 corresponding to different alignments of the user's teeth may be fed in the rapid dental mold supplying arrangement 60 for producing the corresponding dental aligners in one simple actuation of the dental aligner apparatus of the present invention.

Figure 2:
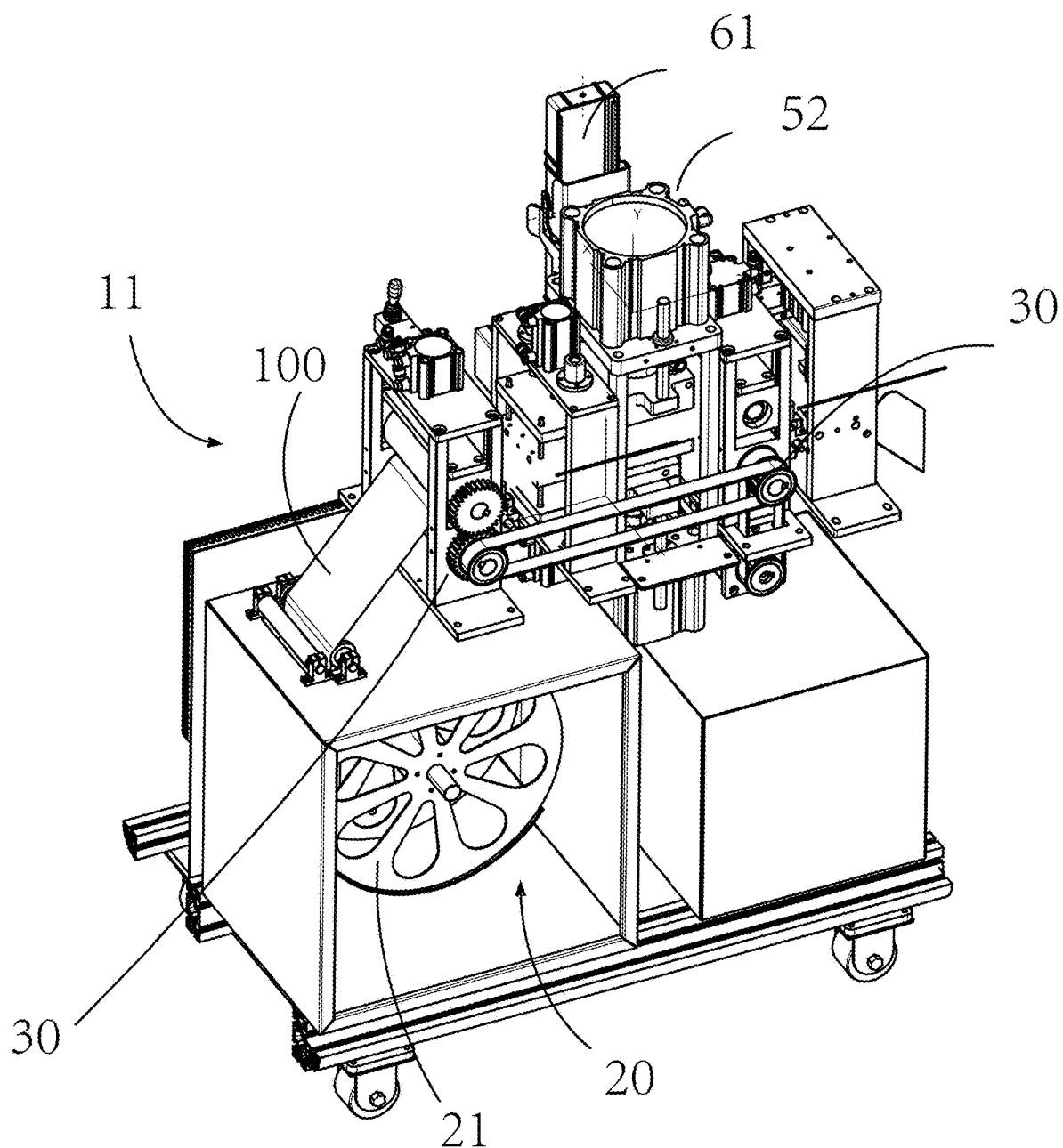
FIG. 2 is a perspective view of the dental aligner apparatus according to a preferred embodiment of the present invention, illustrating internal components of the dental aligner apparatus.
Figure 3:
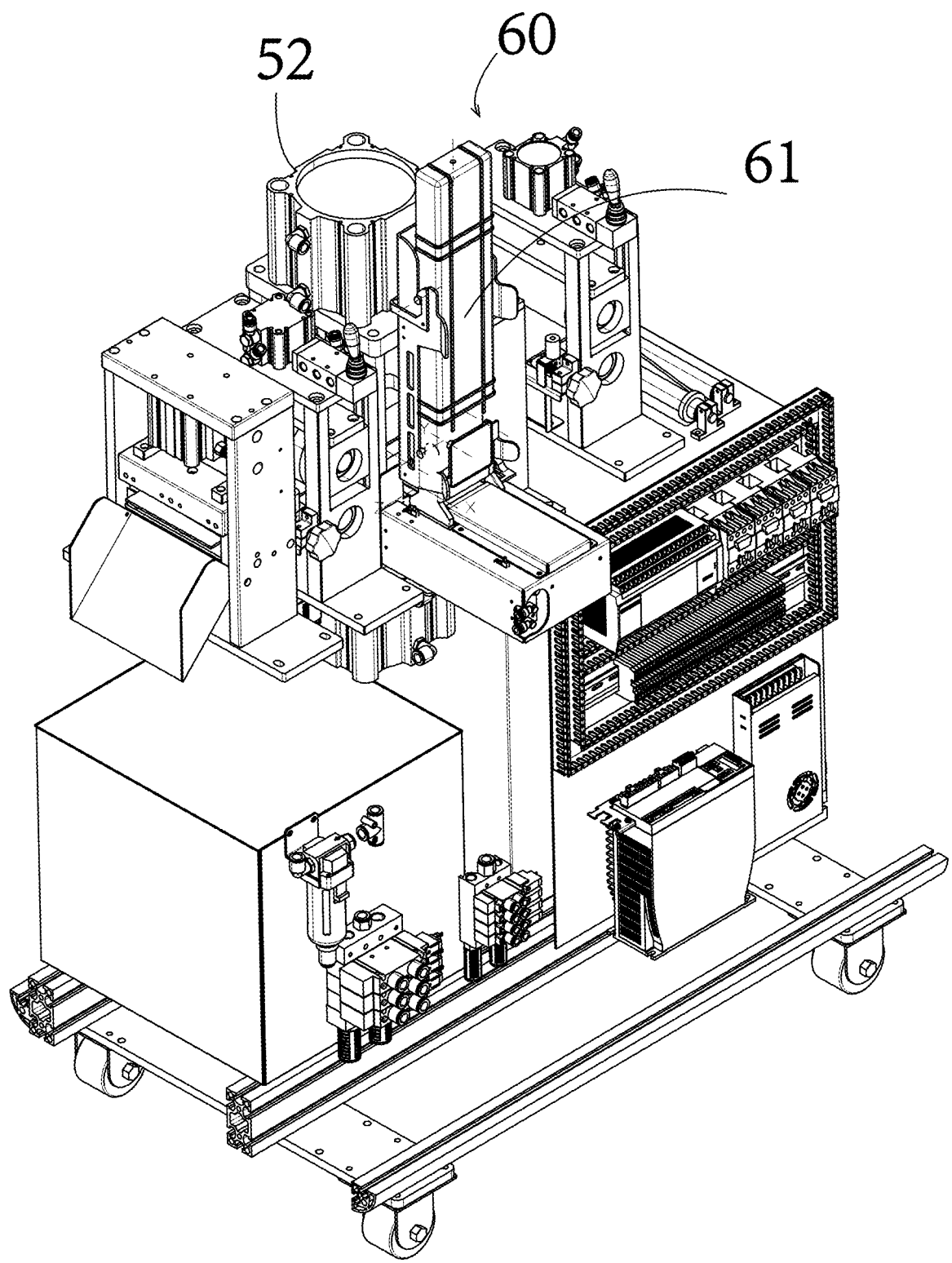
FIG. 3 is another perspective view of the dental aligner apparatus according to a preferred embodiment of the present invention.
Figure 4:
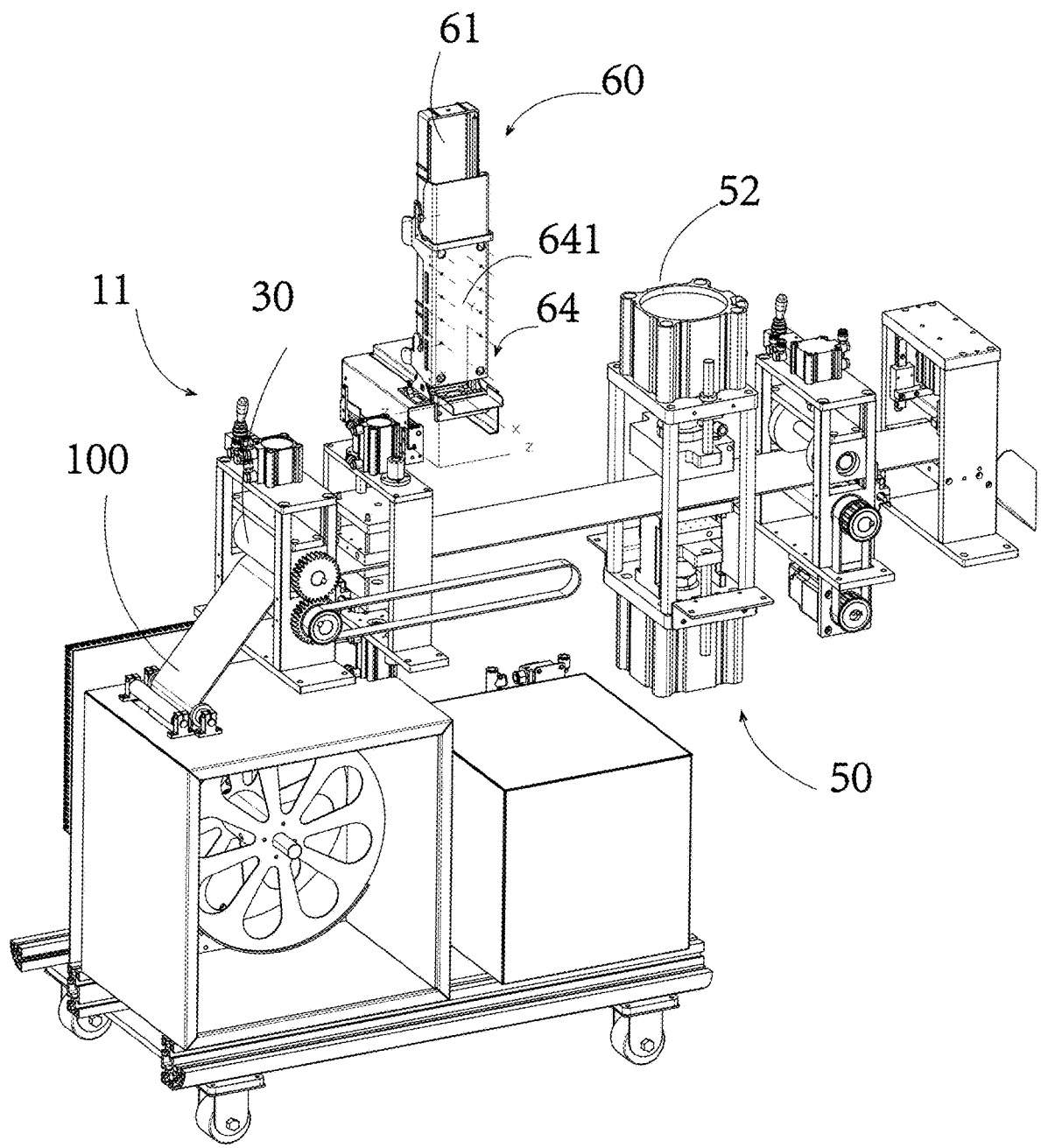
FIG. 4 is an exploded perspective view of the dental aligner apparatus according to a preferred embodiment of the present invention.
Figure 5:
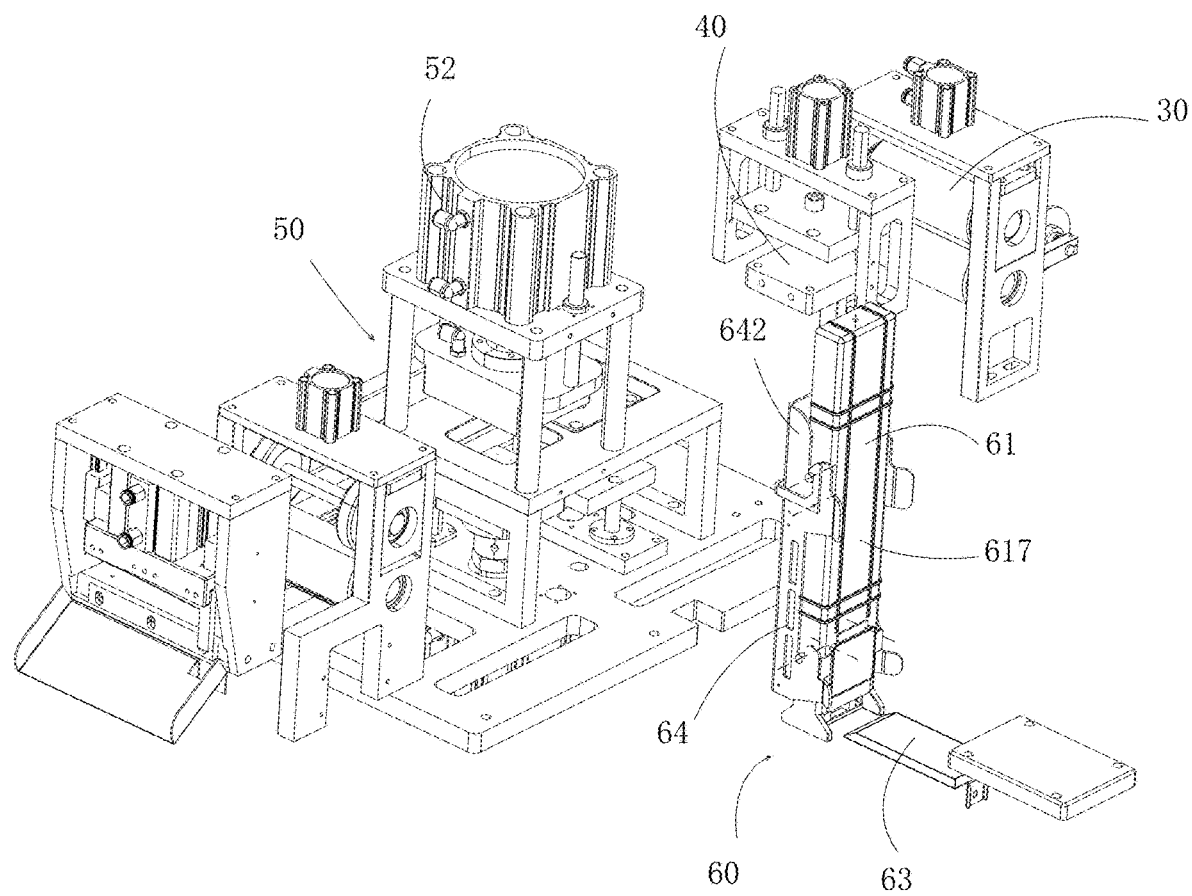
FIG. 5 is another exploded perspective view of the dental aligner apparatus according to a preferred embodiment of the present invention.
Figure 6:
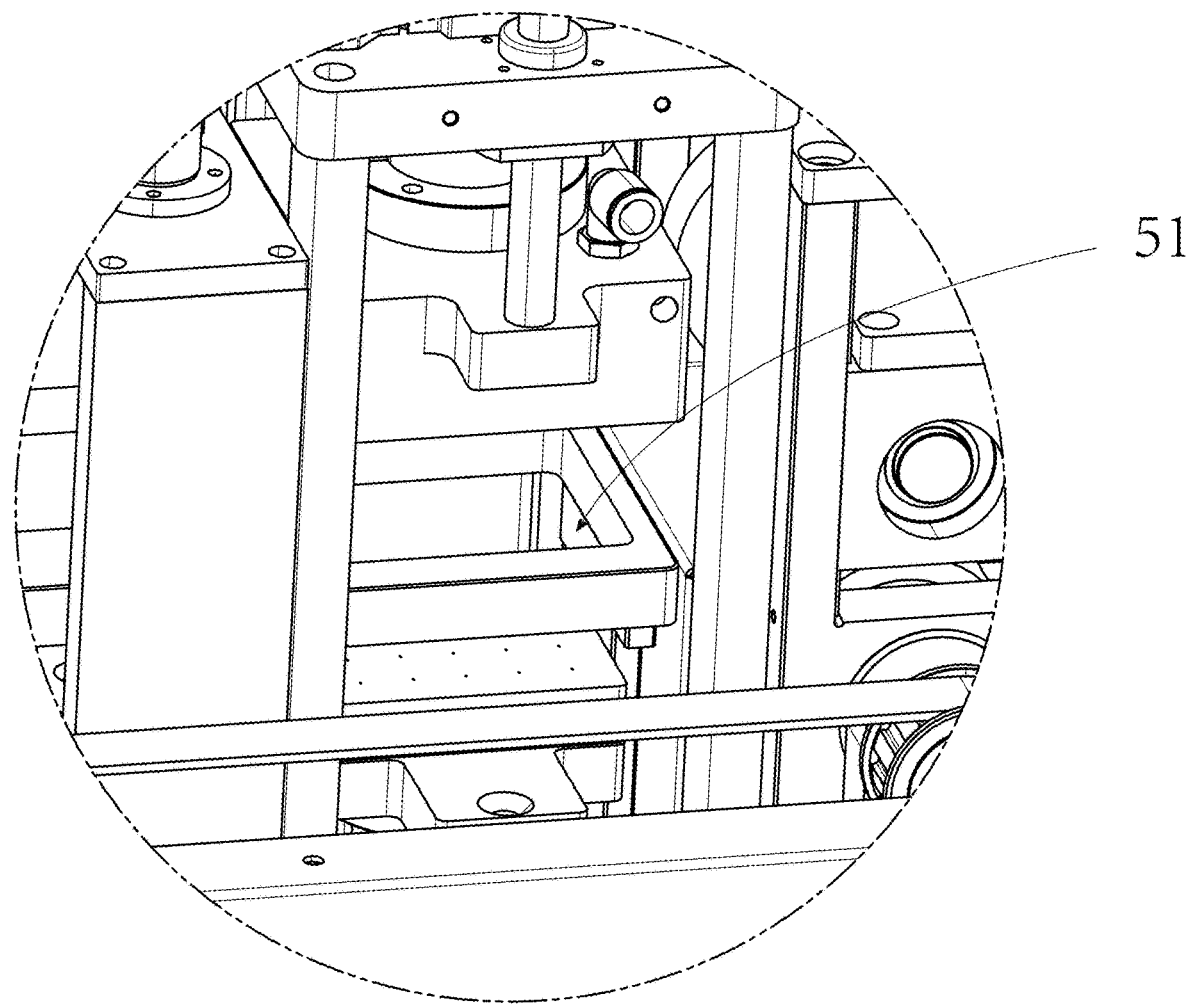
FIG. 6 is a perspective view of a high pressure blowing module of the dental aligner apparatus according to the preferred embodiment of the present invention.

The main housing 10 may represent the outermost casing of the dental aligner apparatus of the present invention. All other components may be received in the receiving cavity 11. Referring to FIG. 1 to FIG. 3 of the drawings, the raw material feeder 20 may comprise a feeding roller 21 rotatably supported in the main housing 10, wherein sheet raw material 100 may be engaged with the feeding roller 21 in such a manner that when the feeding roller 21 is driven to rotate, the sheet raw material 100 may be driven to move along different components in the main housing 10. The feeding roller 21 may be connected to a driving motor which may be connected to a central processing unit so as to drive the feeding roller 21 to rotate in a controlled manner. In a preferred embodiment of the present invention, the feeding roller 21 may be rotatably supported at a lower portion of the main housing 10. It is important to note, however, that the feeding roller 21 may be mounted anywhere in the main housing 10 depending on the circumstances in which the present invention is manufactured.

The sheet raw material 100 is the raw material used to manufacture the dental aligners. The sheet raw material 100 may be configured from flexible, deformable and strong material, such as specifically designed composite materials, resin, polymethyl methacrylate (PMMA), or the likes. The sheet raw material 100 is arranged to freely deform when heated by the heating element 40. The deformed sheet raw material is arranged to harden when cooled.

The guiding rollers 30 may be distributed in the main housing 10 to guide a travel path of the sheet raw material 100. For example, as shown in FIG. 2 of the drawings, the sheet raw material 100 may be supported on the guiding rollers 30 in a stretched manner so as to maintain a predetermined tension when it is traveled along the guiding rollers 30 and other components of the dental aligner apparatus.

Each of the guiding rollers 30 may be configured as having a cylindrical structure, and may be arranged to engage with some portions of the sheet raw material 100. At least one of the guiding rollers 30 may be driven to rotate so as to create a driving force to drive the sheet raw material 100 to move in a dedicated path. The guiding rollers 30 may be distributed in the receiving cavity 11 of the main housing 10 for guiding a moving path of the sheet raw material 100. The guiding rollers 30 may also ensure the sheet raw material 100 to move in a tensioned manner.

The heating element 40 may be supported in the receiving cavity 11 and may be in thermal communication with the sheet raw material 100. The sheet raw material 100 may be driven to pass through the heating element 40. The heating element 40 may be arranged to generate heat for softening the portion of the sheet raw material 100 which passes through it. The heated sheet raw material 100 may form a state in which it can be easily deformable. The dental aligner apparatus may comprise a plurality of heating elements 40 each may be configured as a heat plate or any other apparatus which may generate heat. In this preferred embodiment, there exist two heat plates overlappedly arranged in which the sheet raw material 100 may be arranged to pass through the space between the two heat plates.

The heated sheet raw material 100 may be fed into the high pressure blowing module 50 for producing the dental aligner. At the same time, the rapid dental mold supplying arrangement 60 may be arranged to supply a corresponding dental mold 200 at a position corresponding to the heated sheet raw material 100. The heated sheet raw material 100 may then be ready to form the dental aligner in the high pressure blowing module 50. The high pressure blowing module 50 may utilize high pressure air to merge the heated sheet raw material 100 and the dental mold 200 to form the dental aligner (described in more details below).

Figure 7:
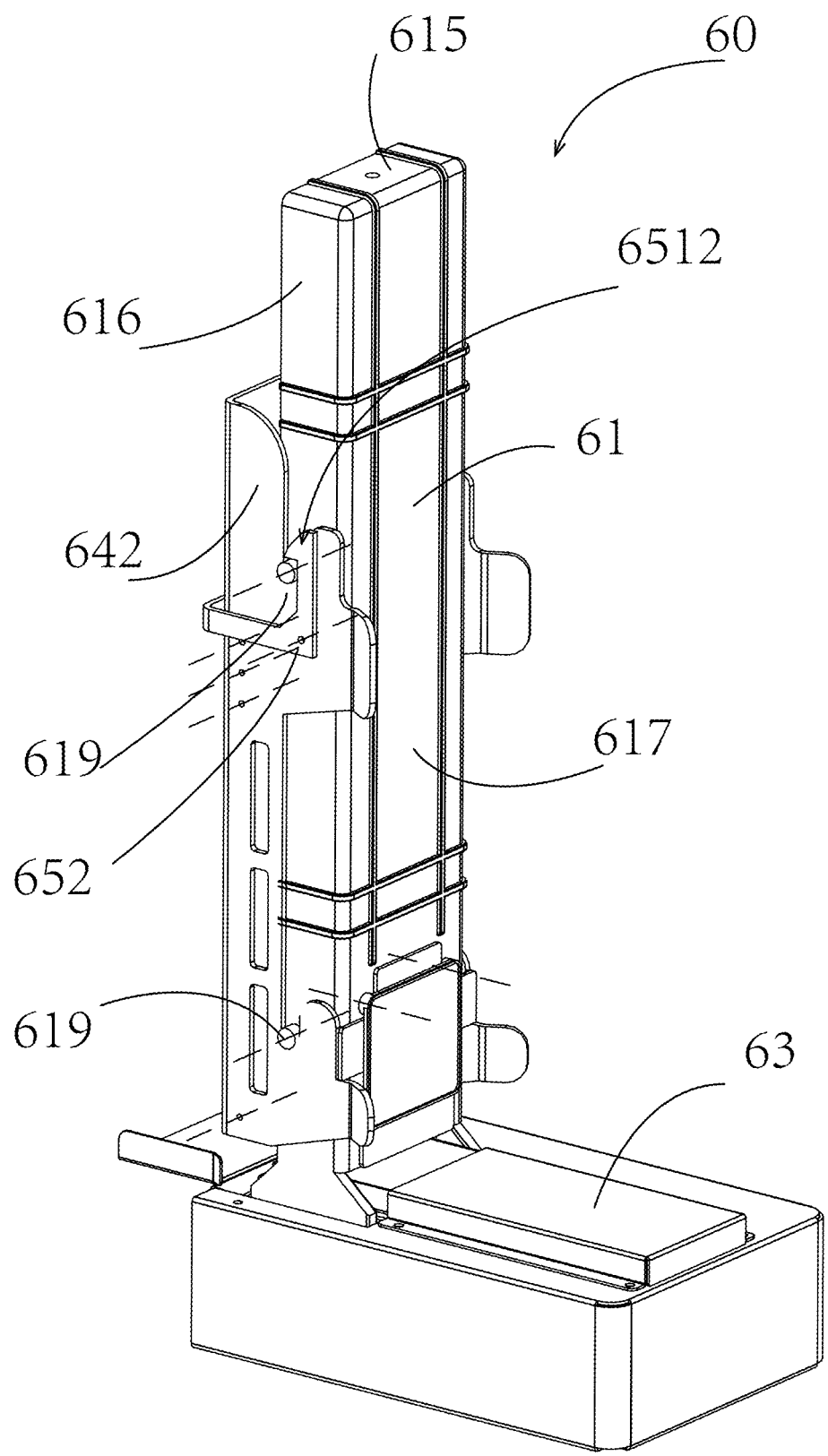
FIG. 7 is a perspective view of a rapid dental mold supplying arrangement of the dental aligner apparatus according to the preferred embodiment of the present invention.
Figure 8:
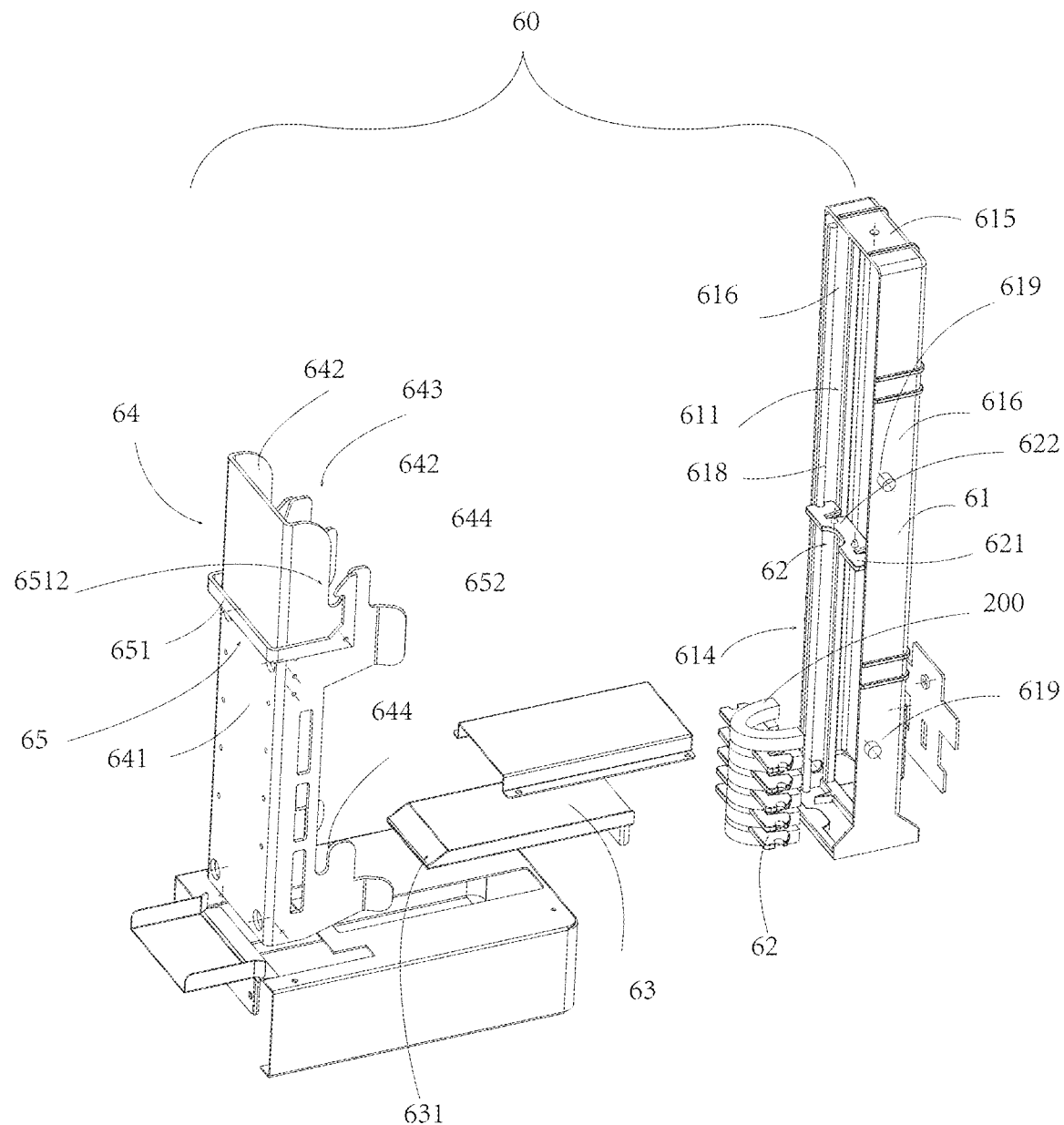
FIG. 8 is an exploded perspective view of the rapid dental mold supplying arrangement of the dental aligner apparatus according to the preferred embodiment of the present invention.

Referring to FIG. 7 to FIG. 8 of the drawings, the rapid dental mold supplying arrangement 60 may comprise the main frame 61, the partitioning plates 62, and the pusher member 63. The main frame 61 may be configured as having an elongated structure, and may have the accommodating cavity 611 formed therein. In this preferred embodiment, the main frame 61 may be mounted in the receiving cavity 11 of the main housing 10 in an upright (preferably vertical) manner. In other words, a longitudinal length of the main frame 61 may extend vertically in the main housing 10, as shown in FIG. 2 to FIG. 3 of the drawings.

More specifically, the main frame 61 may comprise a top panel 615, two side panels 616 and a rear panel 617 extending between the two side panels 616. The accommodating cavity 611 may be formed in a space surrounded by the top panel 615, the side panels 616 and the rear panel 617. A longitudinal length of each of the side panels 616 is substantially longer than that of is width for forming the elongated structure of the main frame 61. Thus, the main frame 61 may resemble a substantially rectangular structure.

A length of the rear panel 617 may be shorter than that of the adjacent side panels 616 so as to form the operation opening 612 at the bottom portion 613 of the main frame 61. In addition, the main frame 61 may further have an access opening 614 extending along a longitudinal direction thereof. The access opening 614 may allow an operator of the present invention to refill the partitioning plates 62 and the dental molds 200 in the accommodating cavity 611 when all dental molds 200 are utilized to produce the dental aligners.

Figure 10:
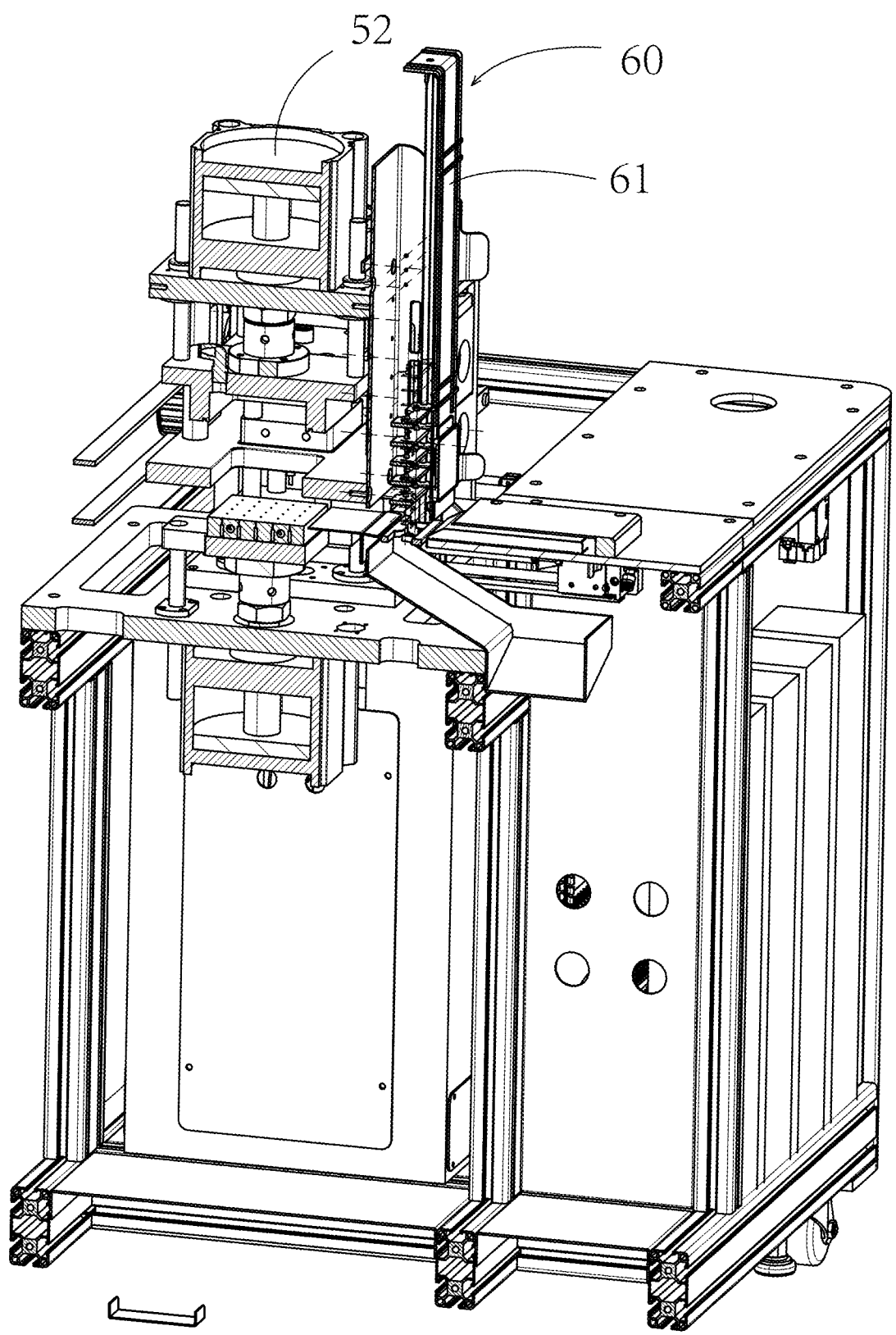
FIG. 10 is a sectional schematic view of the dental aligner apparatus according to a preferred embodiment of the present invention.
Figure 11:
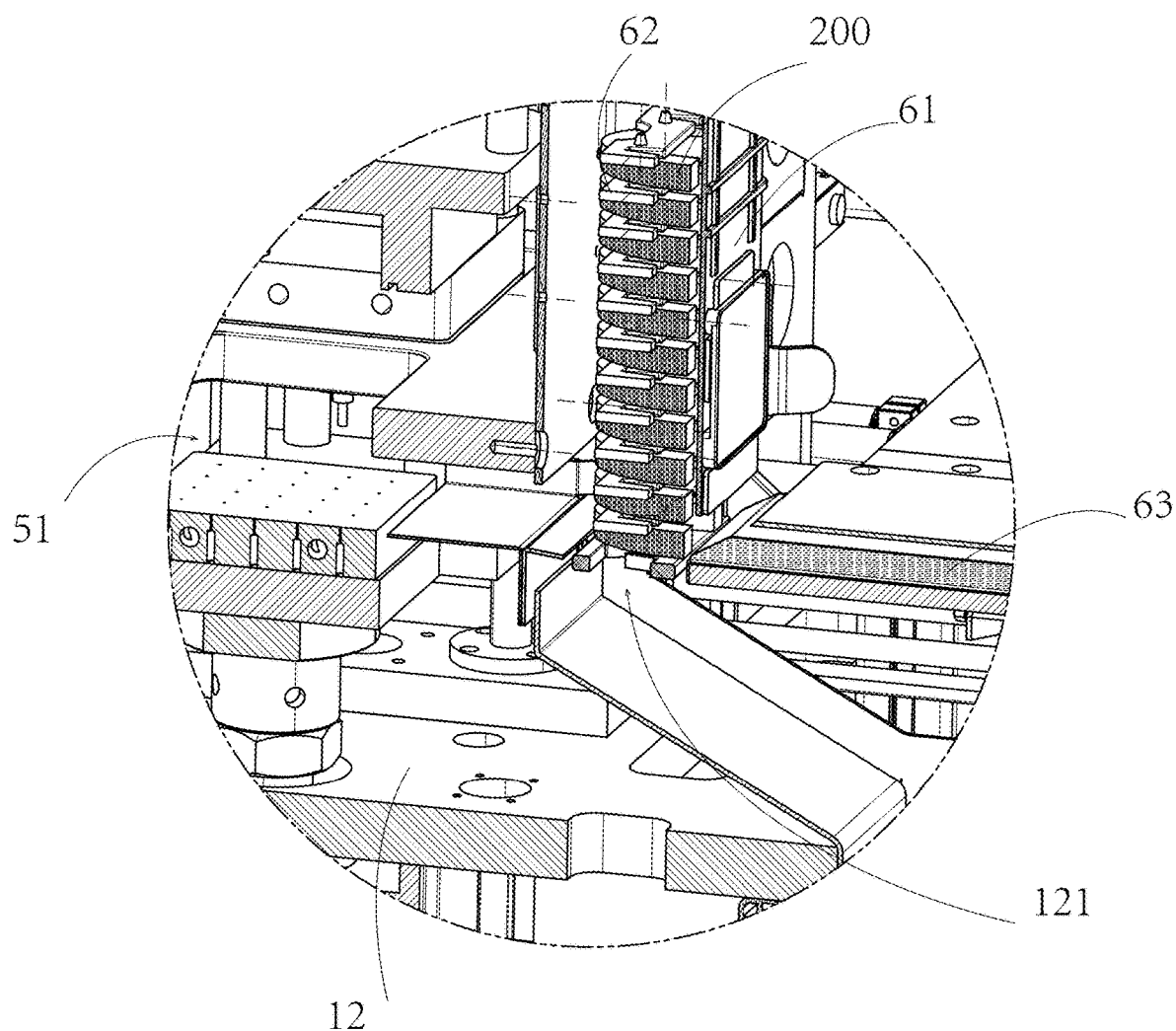
FIG. 11 is a partially enlarged view of FIG. 10.

The accommodating cavity 611 may be arranged to accommodate a plurality of dental molds 200. Each two adjacent dental molds 200 may be separated by a partitioning plate 62. The partitioning plates 62 may be slidably supported in the accommodating cavity 611 in an array having a single column. In other words, a partitioning plates 62 may be "stacked" on a dental mold 200 underneath. At the same time, the partitioning plate 62 may support another dental mold 200 on top. Thus, the partitioning plates 62 and the dental molds 200 may be distributed along a longitudinal direction of the accommodating cavity 611 as shown in FIG. 10 and FIG. 11 of the drawings.

Figure 12:
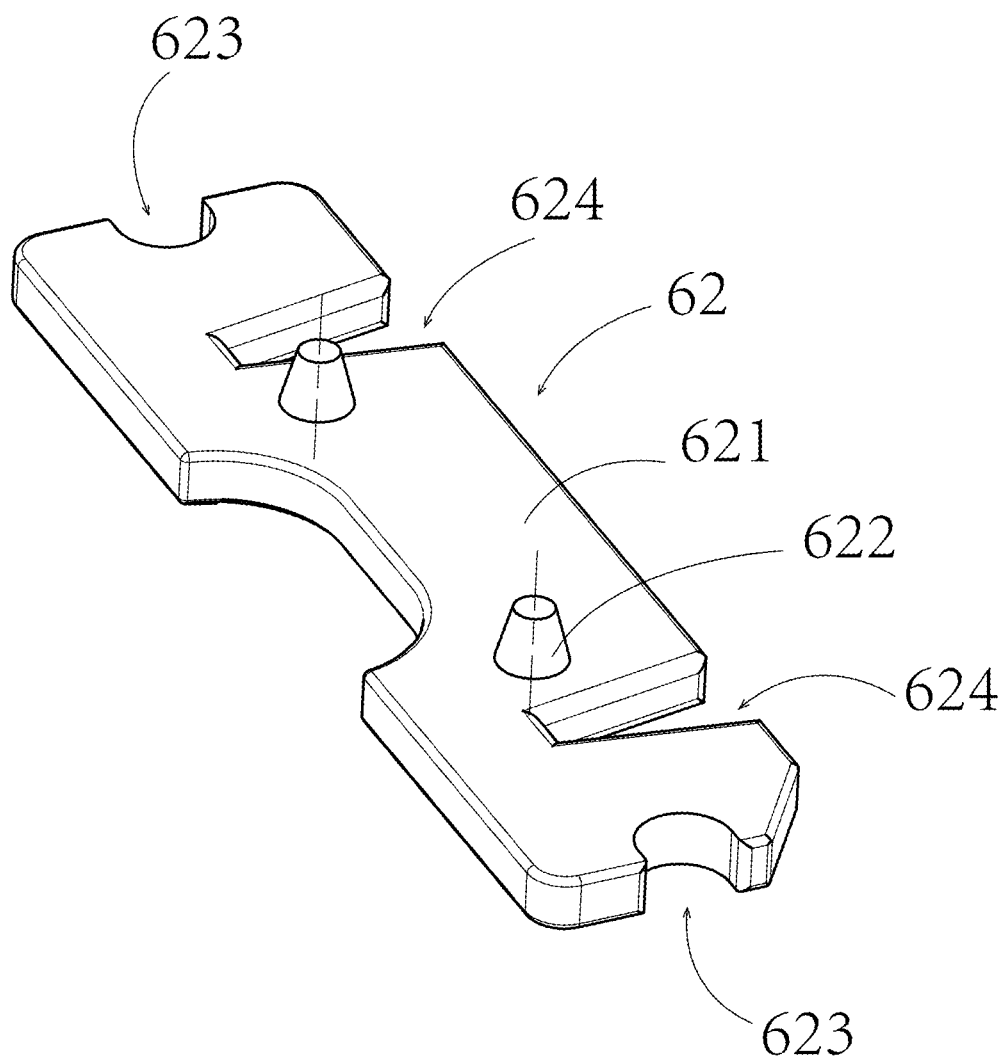
FIG. 12 is a perspective view of a partitioning plate of the rapid dental mold supplying arrangement according to the preferred embodiment of the present invention.

As shown in FIG. 8 and FIG. 12 of the drawings, each of the partitioning plates 62 may be configured as having a planar structure and may comprise a base plate 621 and a plurality of protrusions 622 upwardly extended from the base plate 621. The protrusions 622 may engage with a corresponding slot on the corresponding dental mold 200 so as to support the dental mold 200 on the base plate 621. The pusher member 63 may be arranged to push the dental mold 200 through the operation opening 612.

Each of the partitioning plates 62 may further have two engaging slots 623 formed on two sides thereof, while the main frame 61 may further comprise two sliding tracks 618 provided on the two side panels 616 respectively at positions in the vicinity of the access opening 614. The two sliding tracks 618 may extend along a longitudinal direction of the main frame 61. Each of the engaging slots 623 of a partitioning plate 62 may slidably engage with the two sliding tracks 618 respectively so as to allow the corresponding partitioning plate 62 to slide along the longitudinal direction of the main frame 61. Since the main frame 61 is supported in the main housing 10 in an upright manner, the partitioning plate 62 may tend to slide downwardly along the sliding tracks 618 due to gravity. In other words, when the bottommost dental mold 200 is pushed out of the main frame 61, the immediately upper partitioning plate 62 may slide downwardly to be discharged out of the main frame 61 and the immediately upper dental mold 200 may downwardly slide along the sliding tracks 618 for exposing to the operation opening 612. This dental mold 200 may then be ready to be pushed by the pusher member 63 for forming another dental aligner. This process may repeat until all dental molds 200 in the accommodating cavity 611 are pushed out thereof.

In order to support the main frame 61 in the receiving cavity 11, the rapid dental mold supplying arrangement 60 may further comprise a supporting bracket 64 mounted on the work platform 12. The supporting frame 64 may upwardly extend from the work platform 12, wherein the main frame 61 may detachably mount on the supporting bracket 64. Thus, the main frame 61 may be conveniently detached from the supporting bracket 64 for replacement and refill of the dental molds 200 in the accommodating cavity 611.

More specifically, the supporting bracket 64 may have a main panel 641 and two side sleeves 642 extending from the main panel 641 to form a supporting cavity 643 between the main panel 641 and the side sleeves 642, wherein the main frame 61 is detachably mounted in the supporting cavity 643. The supporting bracket 64 may further have a plurality of mounting slots 644 formed on the side sleeves 642 respectively, while the main frame 61 may further have a plurality of engaging pins 619 outwardly protruded from two side panels 616 at positions corresponding to the mounting slots 644 respectively. The engaging pins 619 may be arranged to detachably engage with the mounting slots 644 so as to detachably mount the main frame 61 on the supporting bracket 64. As shown in FIG. 8 of the drawings, each side sleeve 642 may have two mounting slots 644 and the main frame 61 may have four engaging pins 619 detachably engaging with the mounting slots 644 respectively.

The rapid dental mold supplying arrangement 60 may further comprise a locking latch 65 pivotally mounted on the main panel 641 for selectively locking at least one of the engaging pins 619 in at least one of the mounting slots 644. The locking latch 65 may comprise a handle frame 651 and two latch members 652 extended from the handle frame 651 and pivotally connected to the two side sleeves 642 respectively. Thus, the locking latch 645 may pivotally move with respect to the supporting bracket 64.

As shown in FIG. 7 to FIG. 8 of the drawings, each of the latch members 652 has an inclined edge 6521 extended toward the corresponding mounting slot 644 so as to normally block that corresponding mounting slot 644. The corresponding engaging pin 619 may be allowed to insert into the mounting slot 644 by exerting a downward biasing force against the inclined edge 6521. When such biasing force is applied to the inclined edge 6521, the corresponding latch member 652 is driven to move pivotally to so that the inclined edge 6521 may be moved to unblock the mounting slot 644. As such, the engaging pin 619 may be allowed to engage with the corresponding mounting slot 644.

After engagement, the engaging pins 619 may be locked in the mounting slots 644 until a user pivotally moves the handle frame 651 to pivotally move the latch member 652 from blocking the mounting slot 644. The locking latch 65 may ensure secure engagement between the supporting bracket 64 and the main frame 61.

Figure 9:
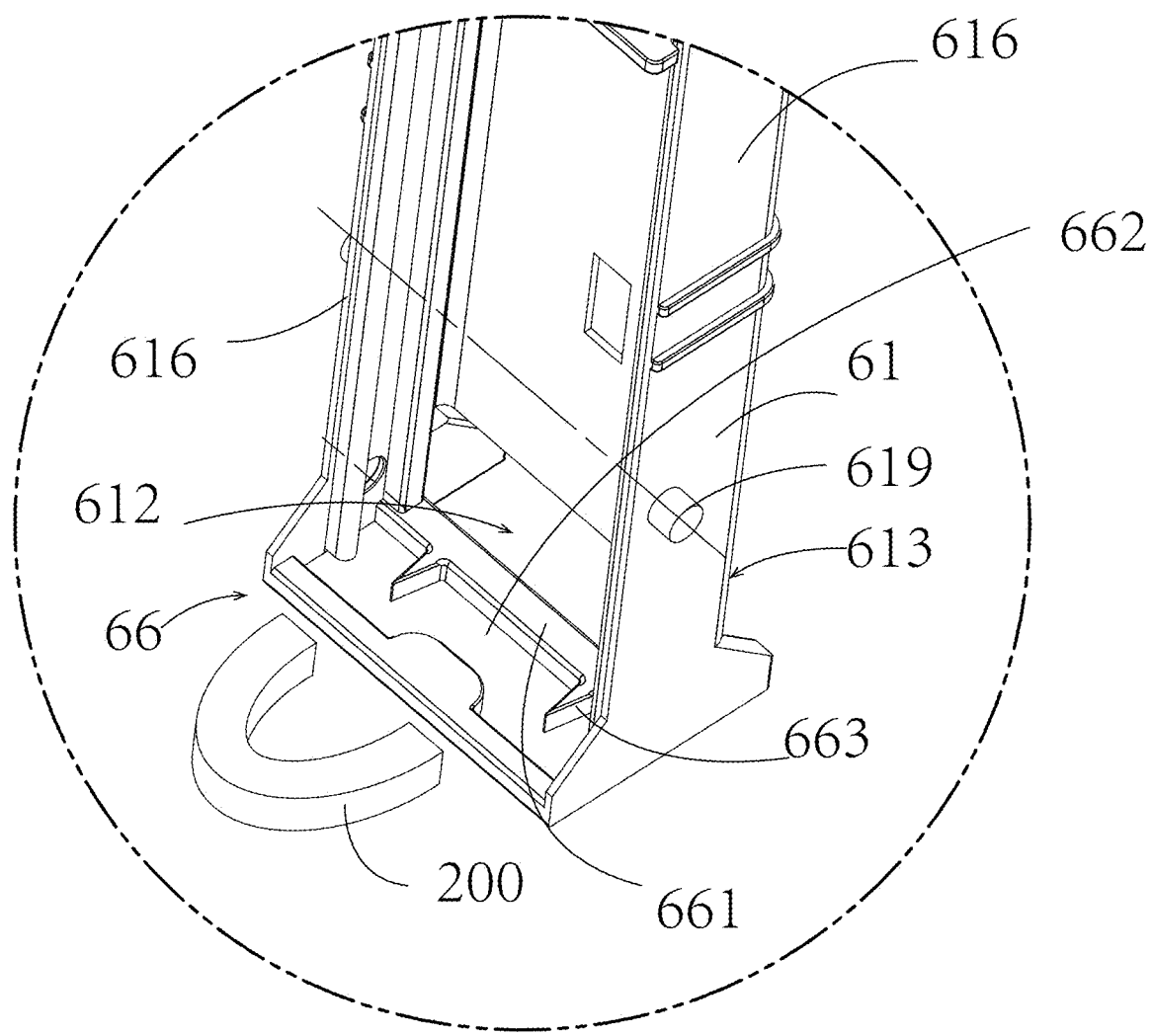
FIG. 9 is a enlarged view of a mold rack of the rapid dental mold supplying arrangement according to the preferred embodiment of the present invention.

Referring to FIG. 9 of the drawings, the main frame 61 may comprise a mold rack 66 formed at a bottom portion 613 thereof, wherein the mold rack 66 may be arranged to support the dental mold 200 exposing to the operation opening 612 (i.e. the bottommost dental mold 200 in the accommodating cavity 611). The mold rack 66 may comprise a plurality of rack members 661 and define a through opening 662 for allowing the partitioning plates 62 to pass through. Thus, the through opening 662 may be shaped and sized to correspond to that of the partitioning plate 62 so that when the dental mold 200 is pushed out of the operation opening 612, the partitioning plate 62 right above this dental mold 200 may be arranged to pass through the through opening 662. At the same time, however, the through opening 662 may also be shaped and sized such that the bottommost dental mold 200 may be prevented from passing through the through opening 662 and supported by the rack members 661. In other words, the through opening 662 may only allow the partitioning plate 62 to pass through while retaining the corresponding dental mold 200 on the rack members 661.

The work platform 12 of the main housing 10 may have a discharge opening 121, wherein the rapid dental mold supplying arrangement 60 may be positioned such that the through opening 662 may be aligned and communicated with the discharge opening 121, so that the partitioning plate 62 passing through the through opening 662 may be allowed to pass through the discharge opening 121. The partitioning plates 62 passing through the discharge opening 121 may eventually be collected for reuse, as shown in FIG. 11 of the drawings.

The pusher member 63 may be movably mounted in the receiving cavity 11 of the main housing 10, and may be connected to a driving unit, such as a pneumatic or hydraulic driving unit. The driving unit may drive the pusher member 63 to slide in a reciprocating manner in and out of the operation opening 612. The pusher member 63 may be configured as a sliding block having a pushing edge 631 positioned corresponding to the exposed dental mold 200 (i.e. the dental mold 200 exposing to the operation opening 612), so that when the pusher member 63 is driven to move, the pushing edge 631 is driven to push the dental mold 200 out of the main frame 61 toward the high pressure blowing module 50 for forming the dental aligner.

The mold rack 66 may further comprise a plurality of (at least one) securing ridges 663 extended from one of the rack members 661 toward the through opening 662 for supporting the dental mold 200 when the dental mold 200 is being pushed by the pusher member 63. The securing ridge 663 may be used to support and stabilize the dental mold 200 when it is being pushed out of the accommodating cavity 661. The securing ridges 663 may prevent the dental mold 200 from tilting and stuck on the mold rack 66. Each of the partitioning plates 62 may be shaped and sized to correspond that that of the through opening 662. Thus, each of the partitioning plates 62 may have two recesses 624 corresponding to the securing ridges 663 respectively for ensuring that the portioning plate 62 may pass through the through opening 662 without any stuck.

The operation of the present invention is as follows: an operator may prepare a plurality of dental molds 200 based on medically approved procedures. Each of the dental molds 200 represents minor adjustment of the user's teeth. The dental molds 200 may be put in the accommodating cavity 611 in such a manner that each two dental molds 200 are separated by one of the partitioning plates 62. When the accommodating cavity 611 is filled with a desirable number of dental molds 200, the main frame 61 may be detachably mounted on the supporting bracket 64 and ready for production of dental aligners. At this stage, the bottommost dental mold 200 may be supported on the mold rack 66, while a corresponding partitioning plate 62 is supported above. The pusher member 63 may be retained at the idle position initially.

The dental aligner apparatus may then be activated to drive the sheet raw material 100 to pass through the heating elements 40 to convert some portions of the sheet raw material into heated, soften and deformable state. At the same time, the pusher member 63 may then be activated to slide through the operation opening 612 to the working position so as to push the bottommost dental mold 200 out of the operation opening 612. At this time, the partitioning plate 62 may rest on a top surface of the pusher member 63. When the pusher member 63 returns to its original position, the partitioning plate 62 may drop through the through opening 662 and the discharge opening 12, while another dental mold 200 which is the dental mold 200 supported immediately above the dental mold 200 being pushed out of the accommodating cavity 611 (i.e. the original bottommost dental mold 200) may automatically slide downward due to gravity and subsequently supported by the mold rack 66. This dental mold 200 is ready for being pushed out by the pusher member 63 for producing another dental aligner.

On the other hand, the first bottommost dental mold 200 may be pushed to the high pressure blowing module 50 for engaging with the heated, soften and deformable state of the sheet raw material. High pressure air is applied to the sheet raw material 100 so as to allow the heated, soften and deformable raw material to conform to a predetermined shape according to that of the dental mold 200. The dental mold 200 and the attached raw material is then allowed to cool to form a semi-product of the dental aligner. This semi-product is then cut and discharged out of the main housing 10 to form a complete dental aligner.

It is worth mentioning that one of the distinguishing feature of the present invention is the use of the rapid dental mold supplying arrangement 60 for substantially enhancing the efficiency of producing the dental aligners. A certain number of dental molds 200 may be loaded into the accommodating cavity 611. Once the dental aligner apparatus is actuated, the reciprocating movement of the pusher member 63 and automatic drop of the dental molds 200 at the operation opening 612 allow rapid production of dental aligners without substantial human intervention. Human only intervenes when they need to refill the dental molds 200. All they need to do is to take out the main frame 61 from the supporting bracket 64 and refill the dental molds 200 and the partitioning plates 62. For even higher efficiency, several main frames 61 may be pre-prepared and each of them may be pre-filled with dental molds 200 corresponding to specific patients. Once a main frame 61 is removed, another one can be mounted on the supporting bracket 64 and restarts the production cycle.

These arrangements substantially boosts up the efficiency of producing dental aligner as compared with traditional technology in which dental mold needs to be manually fed to the machine one-by-one.

The present invention, while illustrated and described in terms of a preferred embodiment and several alternatives, is not limited to the particular description contained in this specification. Additional alternative or equivalent components could also be used to practice the present invention.

What is claimed is:

1. A rapid dental mold supplying arrangement for a dental aligner apparatus having a high pressure blowing module, the rapid dental mold supplying arrangement comprising:

a main frame having an accommodating cavity for accommodating a plurality of dental molds and a through operation opening formed at a bottom portion thereof, the main frame comprising a mold rack formed at a bottom portion thereof, wherein the mold rack is arranged to support the dental mold exposing to the operation opening, the mold rack comprising a plurality of rack members and defining a through opening;

a plurality of partitioning plates detachably provided in the accommodating cavity, each of the partitioning plates being positioned between two adjacent dental molds, the through opening of the mold rack being shaped and sized to allow at least one of the partitioning plates to pass through while retaining the corresponding dental mold to stay on the rack members; and a pusher member movably supported in a receiving cavity of the dental aligner apparatus in such a manner that the pusher member is arranged to move between an idle position and a working position, wherein in the idle position, the pusher member is at rest and is aligned with the through operation opening, wherein in the working position, the pusher member is moved to slide through the through operation opening so as to push the corresponding dental mold out of the accommodating cavity to feed into the high pressure blowing module, so that the dental mold is capable of being conformed with the sheet raw material in heated and deformable form to form a dental aligner, wherein when the pusher member is moved back to the idle position, the partitioning plate and the dental mold are discharged out of the dental aligner apparatus.

2. The rapid dental mold supplying arrangement, as recited in claim 1, wherein the main frame is mounted in the main housing in a substantially vertical manner, such that when a dental mold is pushed out of the accommodating cavity by the pusher member, and when the pusher member returns to the idle position, another dental mold is automatically arranged to drop to align with the operation opening by gravity.

3. The rapid dental mold supplying arrangement, as recited in claim 2, wherein the main frame comprises a top panel, two side panels and a rear panel extending between the two side panels, a length of the rear panel being shorter than that of the adjacent side panels so as to form the operation opening at the bottom portion of the main frame, the main frame further having an access opening extending along a longitudinal direction thereof.

4. The rapid dental mold supplying arrangement, as recited in claim 3, wherein each of the partitioning plates comprises a base plate, at least one protrusion upwardly extended from the base plate, the protrusion being arranged to engage with a corresponding slot on the corresponding dental mold so as to support the dental mold on the base plate.

5. The rapid dental mold supplying arrangement, as recited in claim 4, wherein each of the partitioning plates further having two engaging slots formed on two sides thereof, while the main frame further comprises two sliding tracks provided on the two side panels respectively at positions in a vicinity of the access opening, each of the engaging slots of the partitioning plate slidably engaging with the two sliding tracks respectively so as to allow the corresponding partitioning plate to slide along the longitudinal direction of the main frame along the sliding tracks.

6. The rapid dental mold supplying arrangement, as recited in claim 5, wherein the mold rack further comprises at least one securing ridge extended from one of the rack members toward the through opening for supporting the dental mold when the dental mold is being pushed by the pusher member, and preventing the dental mold from tilting and stuck on the mold rack.

7. The rapid dental mold supplying arrangement, as recited in claim 2, wherein the rapid dental mold supplying arrangement further comprises a supporting bracket mounted on the work platform, wherein the main frame is detachably mounted on the supporting bracket, the supporting bracket has a main panel and two side sleeves extending from the main panel to form a supporting cavity between the main panel and the side sleeves, wherein the main frame is detachably mounted in the supporting cavity, the supporting bracket further having a plurality of mounting slots formed on the side sleeves respectively, while the main frame further having a plurality of engaging pins outwardly protruded from two side panels at positions corresponding to the mounting slots respectively, the engaging pins being arranged to detachably engage with the mounting slots respectively so as to detachably mount the main frame on the supporting bracket.

8. The rapid dental mold supplying arrangement, as recited in claim 7, wherein the rapid dental mold supplying arrangement further comprises a locking latch pivotally mounted on the main panel for selectively locking at least one of the engaging pins in at least one of the mounting slots, the locking latch comprising a handle frame and two latch members extended from the handle frame and pivotally connected to the two side sleeves respectively, each of the latch members having an inclined edge extended toward the corresponding mounting slot so as to block the corresponding mounting slot until the engaging pin exerts a downward biasing force against the inclined edge to unblock the mounting slot.

* * * * *